(12) United States Patent
Masatsugu et al.

(10) Patent No.: US 10,099,824 B2
(45) Date of Patent: Oct. 16, 2018

(54) LID MECHANISM

(71) Applicant: TOYODA GOSEI CO., LTD., Kiyosu-shi, Aichi-ken (JP)

(72) Inventors: Yoshinori Masatsugu, Kiyosu (JP); Nobuhiko Yokota, Kiyosu (JP); Hitoshi Fujisawa, Kiyosu (JP)

(73) Assignee: TOYODA GOSEI CO., LTD., Aichi-pref. (JP)

( * ) Notice: Subject to any disclaimer, the term of this patent is extended or adjusted under 35 U.S.C. 154(b) by 87 days.

(21) Appl. No.: 15/435,350

(22) Filed: Feb. 17, 2017

(65) Prior Publication Data

US 2017/0267421 A1    Sep. 21, 2017

(30) Foreign Application Priority Data

Mar. 18, 2016  (JP) .................................. 2016-055596
Mar. 18, 2016  (JP) .................................. 2016-055608
Sep. 27, 2016  (JP) .................................. 2016-188776

(51) Int. Cl.
| | |
|---|---|
| *B65D 45/00* | (2006.01) |
| *B65D 43/26* | (2006.01) |
| *B65D 43/22* | (2006.01) |
| *B60R 7/04* | (2006.01) |

(52) U.S. Cl.
CPC ................ *B65D 43/26* (2013.01); *B60R 7/04* (2013.01); *B65D 43/22* (2013.01); *B65D 2543/00018* (2013.01)

(58) Field of Classification Search
CPC .. E05D 15/50; B60R 7/04; B60R 7/00; B65D 43/26; B65D 51/00; B65D 43/14; B60N 2/793; E05Y 2201/686; E05B 83/32
See application file for complete search history.

(56) References Cited

U.S. PATENT DOCUMENTS

| | | | |
|---|---|---|---|
| 7,743,941 B2 | 6/2010 | Arnoldo et al. | |
| 8,100,453 B2* | 1/2012 | Shimajiri | B60R 7/04 296/37.8 |
| 9,415,910 B2* | 8/2016 | Fukui | B60R 7/04 |
| 9,637,060 B2* | 5/2017 | Gaudig | B60R 7/06 |
| 2016/0114732 A1* | 4/2016 | Sawada | B60R 7/04 224/400 |

FOREIGN PATENT DOCUMENTS

| | | |
|---|---|---|
| JP | 2007-245838 A | 9/2007 |
| JP | 2013-220709 A | 10/2013 |

* cited by examiner

*Primary Examiner* — Shawn M Braden
(74) *Attorney, Agent, or Firm* — Posz Law Group, PLC

(57) ABSTRACT

A dual swing lid mechanism includes a base section and a lid openable and closable with respect to the base section. The lid includes a lid main body section, an arm section, a first supporting shaft, and a second supporting shaft. The lid main body section has a lock mechanism including a first rod engageable with the arm section and a second rod engageable with the base section. The lid changes among a closed state; a first opened state of opening a containing section with the first supporting shaft as a center; and a second opened state of opening the containing section with the second supporting shaft as the center. The first rod engages with the arm section in the closed state and the first opened state and disengages from the arm section in the second opened state. The second rod engages with the base section in the closed state and the second opened state and disengages from the base section in the first opened state.

7 Claims, 6 Drawing Sheets

LID MECHANISM

BACKGROUND

1. Technical Field

The present invention relates to a lid mechanism having a lid that may be opened and closed from either left or right side, and being used in a dual swing container box.

2. Related Art

Known container boxes for vehicles include a single swing container box disposed in a center console of a vehicle and having a lid that may be opened and closed from only one of left and right sides, and a dual swing container box having a lid that may be opened and closed from either left or right side.

A dual swing container box disclosed in Japanese Unexamined Patent Publication No. 2007-245838 includes two types of arm sections for selectively opening a lid from a left side or a right side of a box main body. The two types of arm sections are respectively disposed at longitudinal ends of the box main body. Each of the arm sections includes a bias member for biasing the lid in an opening direction of the lid. When opening the lid from one side, one of the arm sections is left on the box main body and the other arm section integrally moves with the lid. When opening the lid from the other side, the other arm section is left on the box main body and the one arm section integrally moves with the lid. Furthermore, the dual swing container box disclosed in Japanese Unexamined Patent Publication No. 2007-245838 further includes a mechanism for switching connections between the arm sections and the lid.

The dual swing container box disclosed in Japanese Unexamined Patent Publication No. 2007-245838 requires a space in which the arm section is disposed at each of the longitudinal ends of the box main body. This disadvantageously leads to a reduction in a capacity of a containing section provided in the box main body, and a reduction in an opening area of the container box. According to the dual swing container box, when the lid is opened, one of the arm sections can always be visually recognized by a user since one of the arm sections is always left on the box main body. This disadvantageously leads to an unattractive appearance of the dual swing container box with the lid being opened.

SUMMARY

The present invention is made in view of the above circumstances, and an object thereof is to provide a lid mechanism capable of suppressing the reduction in the capacity of the containing section and the reduction in the opening area of the containing section, and furthermore, capable of enhancing the appearance of the container box with the lid being opened.

In order to achieve the object described above, a lid mechanism of the present invention relates to a dual swing lid mechanism including a base section integrated with a box main body having a containing section, and a lid openable and closable from one end side or other end side with respect to the base section. In the dual swing lid mechanism, the lid includes a supporting shaft, a lid main body section, and an arm section. The supporting shaft includes a first supporting shaft that swingably supports the arm section with respect to the base section at the one end side, and a second supporting shaft that swingably supports the lid main body section with respect to the arm section at the other end side. The lid changes among a closed state of shielding a containing section, a first opened state of exposing the containing section when the arm section and the lid main body section are swung with the first supporting shaft as a center, and a second opened state of exposing the containing section when the lid main body section is swung with the second supporting shaft as the center. The lid main body section includes a lock mechanism having a first rod engageable with the arm section at the one end side, and a second rod engageable with the base section at the other end side. The first rod engages with the arm section in the closed state and the first opened state, and disengages from the arm section in the second opened state. The second rod engages with the base section in the closed state and the second opened state, and disengages from the base section in the first opened state.

The lid mechanism of the present invention adopting the above-described configuration can suppress the reduction in the capacity of the containing section and the reduction in the opening area of the containing section, and furthermore, can enhance the appearance of the container box with the lid being opened.

DETAILED DESCRIPTION

Figure 1:
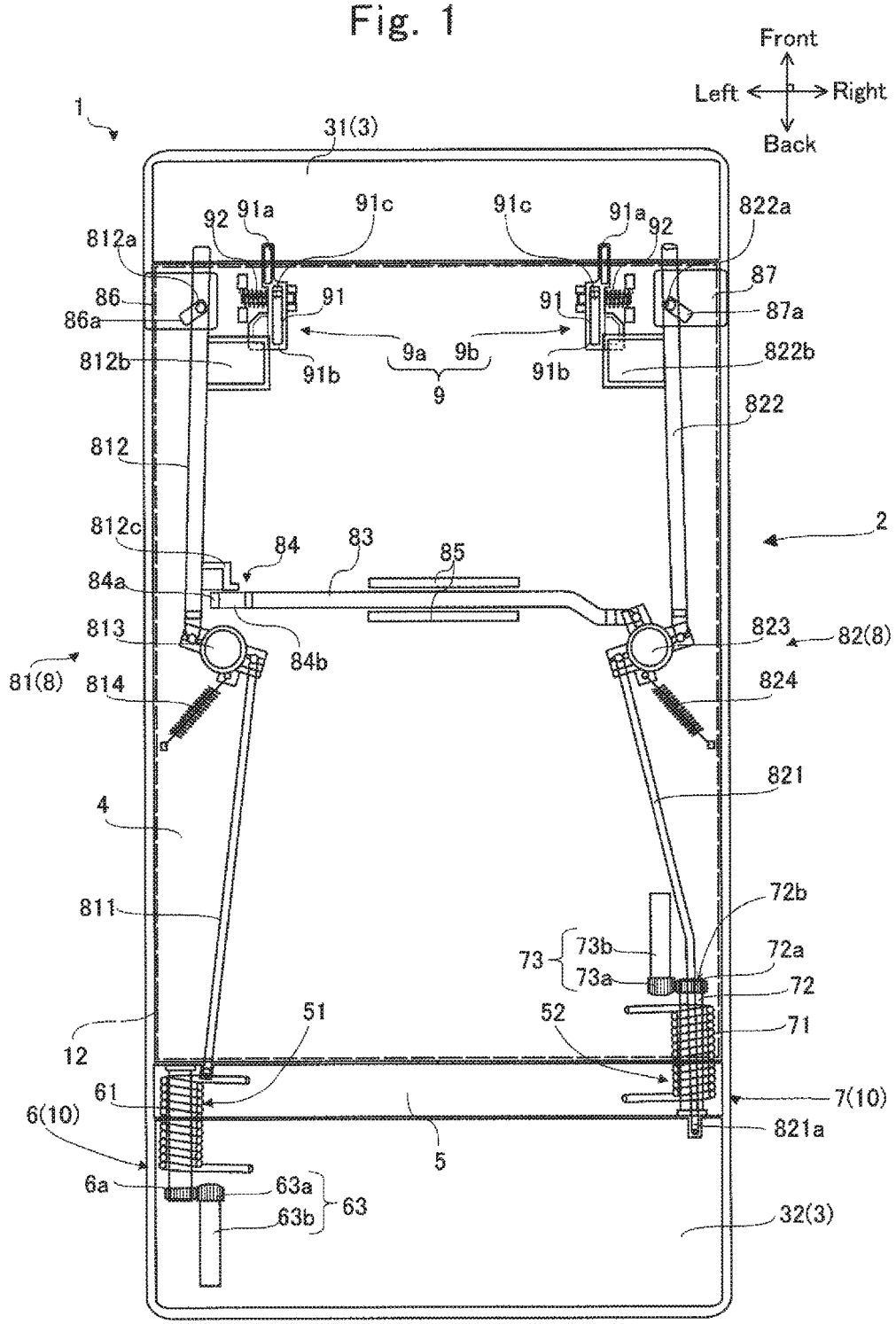
FIG. 1 is an explanatory view showing a lid mechanism according to a first embodiment, in a state where a lock mechanism is in a closed state.

Hereinafter, preferred embodiments of a lid mechanism 1 of the present invention will be described with reference to FIGS. 1 to 8. In FIGS. 1 to 8, front, back, left, right, up, and down indicate directions as viewed in a traveling direction of a vehicle. In the accompanying drawings, identical components are denoted by identical reference numerals, and redundant description thereof will be omitted. The embodiments of the present invention are described as particularly useful modes in which the present invention is implemented, and are not intended to limit the present invention. Furthermore, matters required for the implementation of the present invention which are matters other than the matters particularly cited in the present specification can be understood as design matters of those skilled in the art based on the conventional art in the relevant field. The present invention can be implemented based on the details disclosed in the present specification and the technical common knowledge in the relevant field.

First Embodiment

Figure 2:
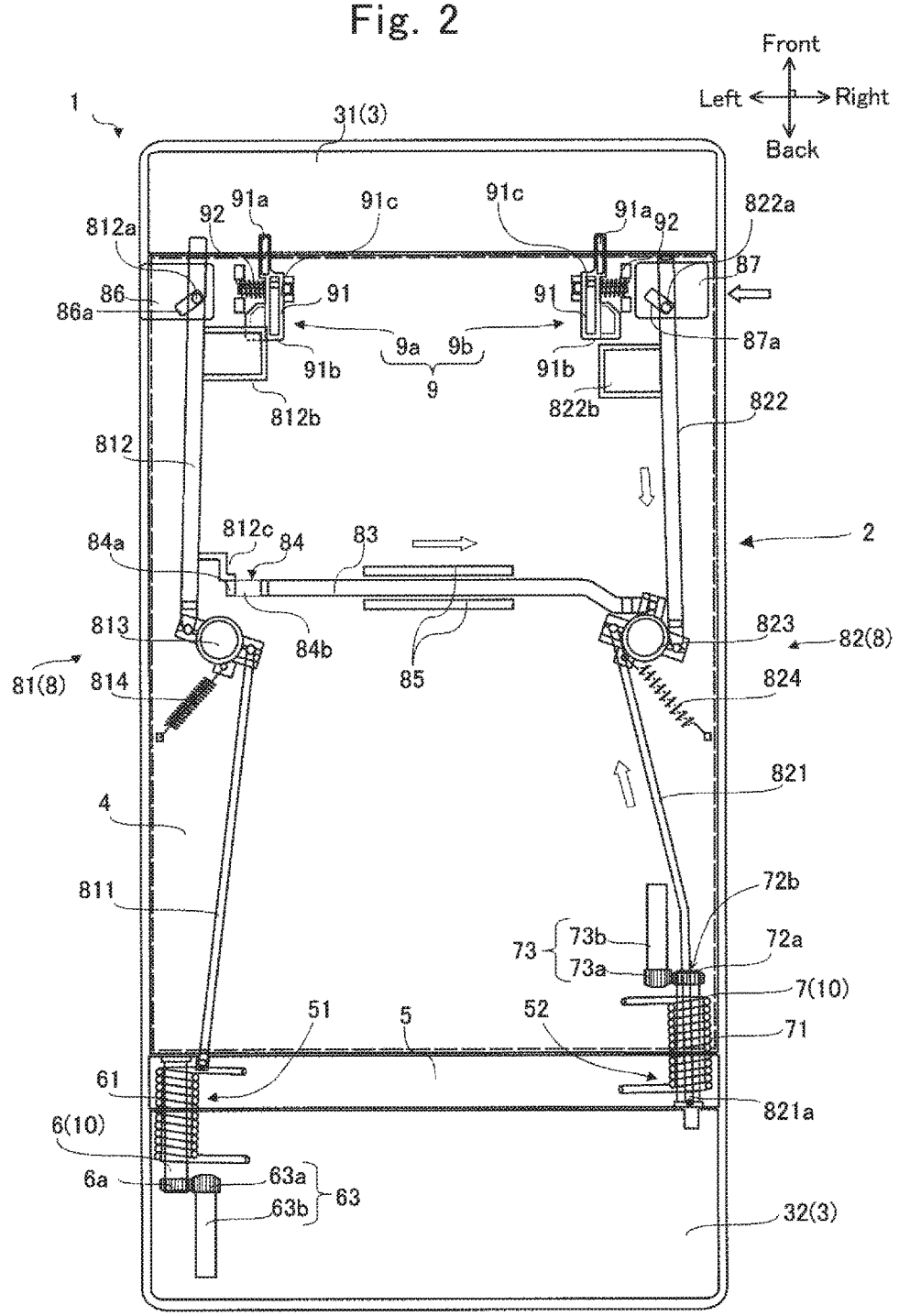
FIG. 2 is an explanatory view showing the lid mechanism according to the first embodiment, in a state where the lock mechanism is in a first opened state.
Figure 3:
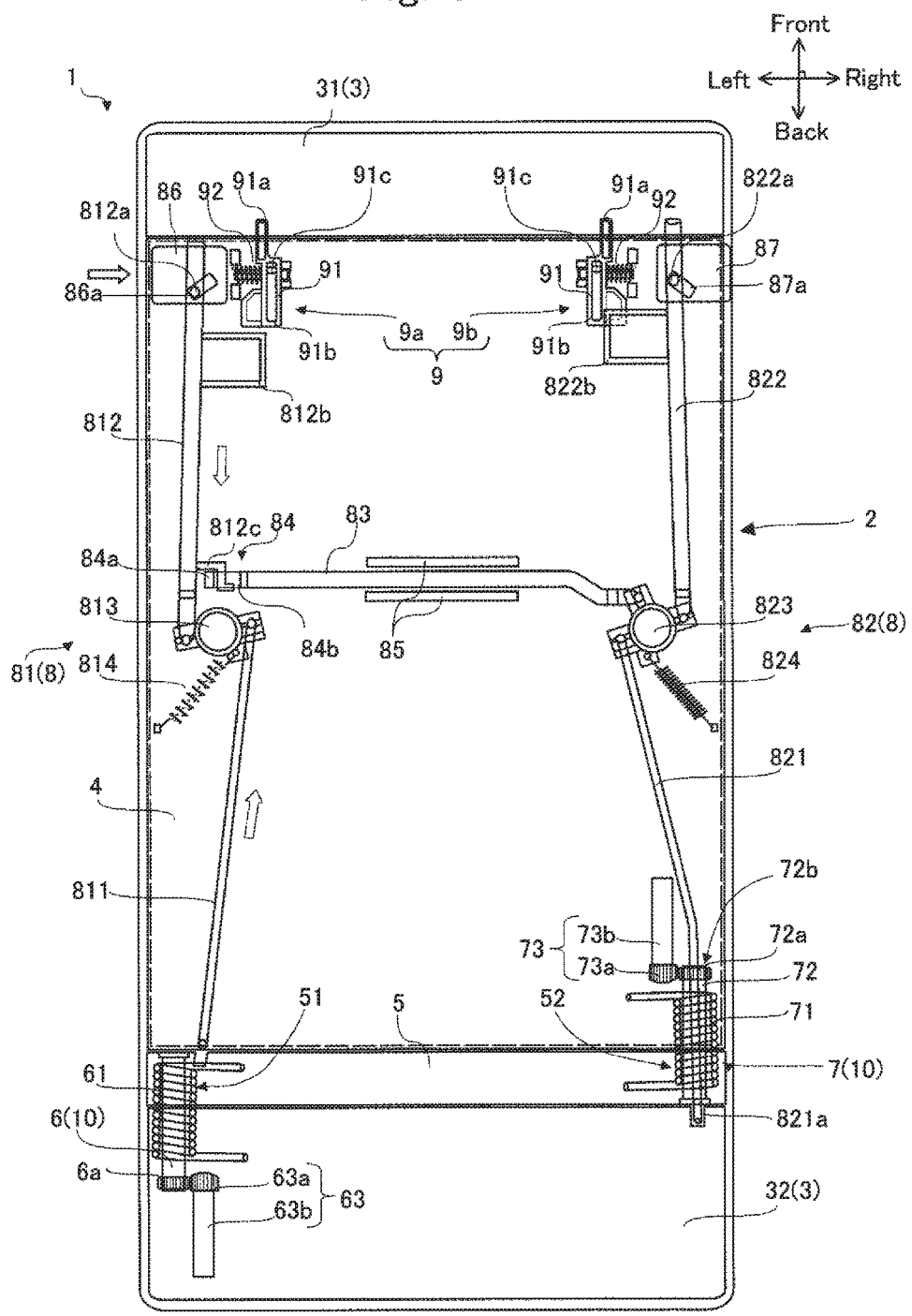
FIG. 3 is an explanatory view showing the lid mechanism according to the first embodiment, in a state where the lock mechanism is in a second opened state.
Figure 4:
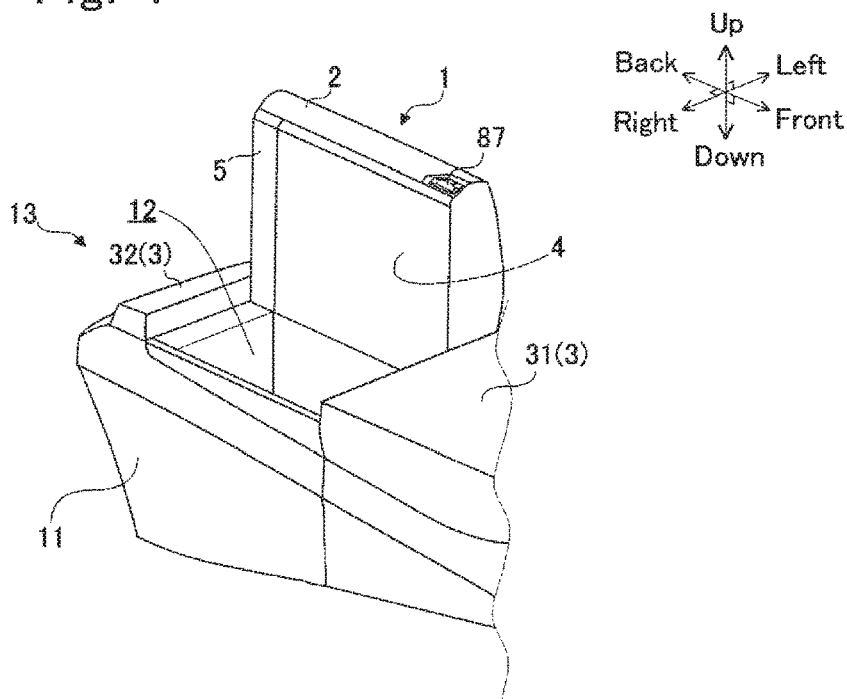
FIG. 4 is an explanatory view showing an example in which the lid mechanism according to the first embodiment is applied to a console box, in a state where a lid is in a first fully-opened position in the first opened state.
Figure 5:
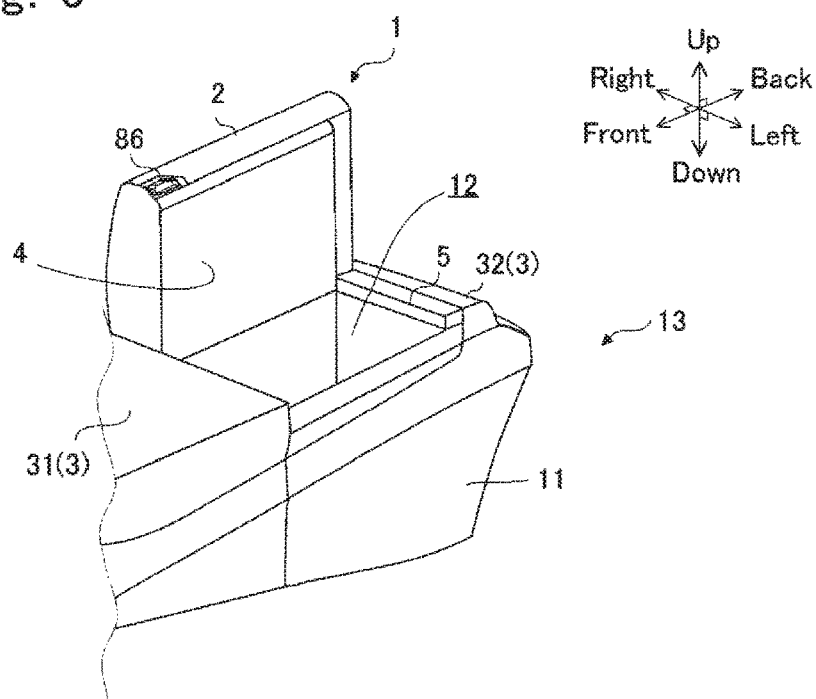
FIG. 5 is an explanatory view showing an example in which the lid mechanism according to the first embodiment is applied to the console box, in a state where the lid is in a second fully-opened position in the second opened state.
Figure 6:
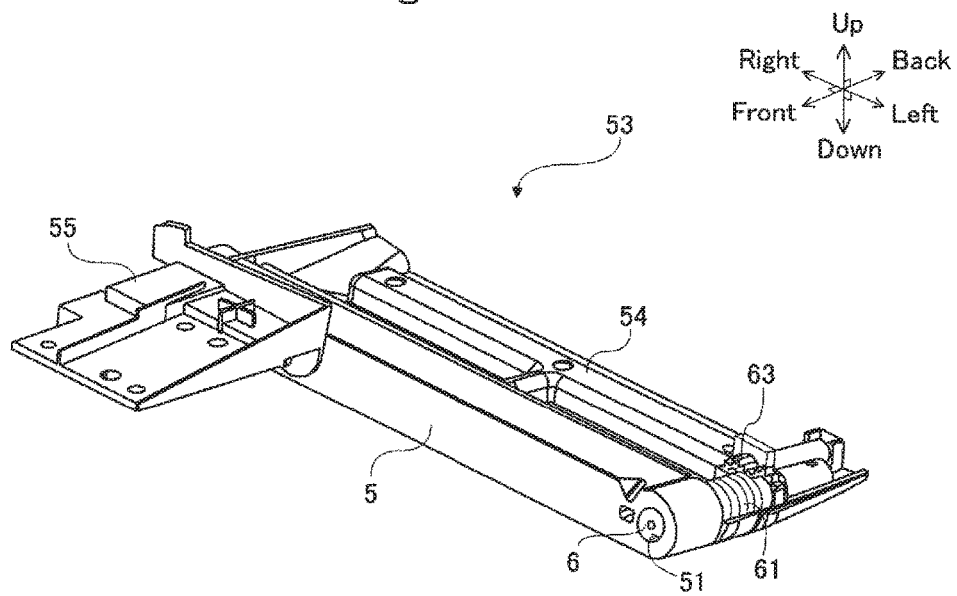
FIG. 6 is a perspective view showing an arm unit in the lid mechanism according to the first embodiment.
Figure 7:
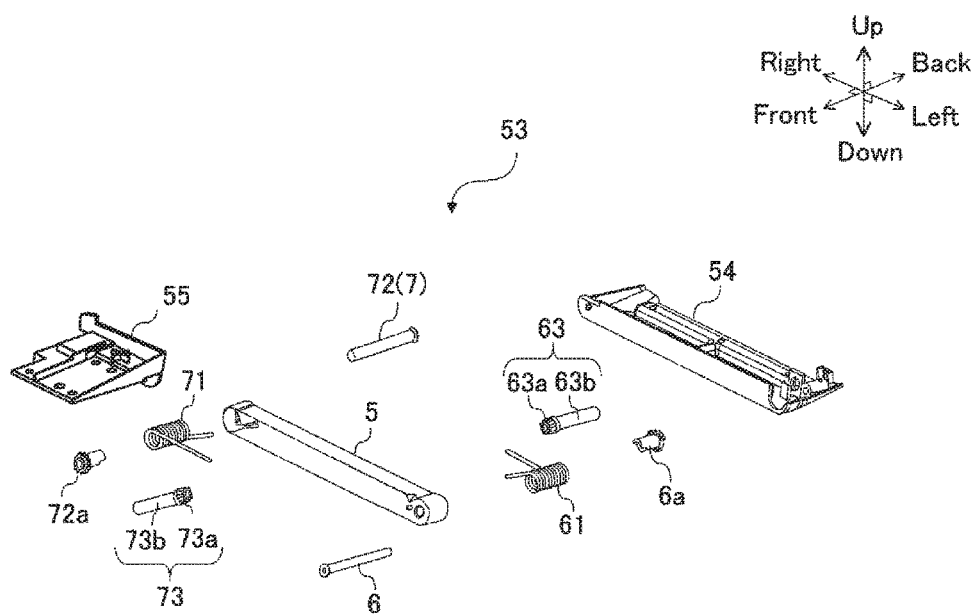
FIG. 7 is an exploded perspective view of the arm unit in the lid mechanism according to the first embodiment.
Figure 8:
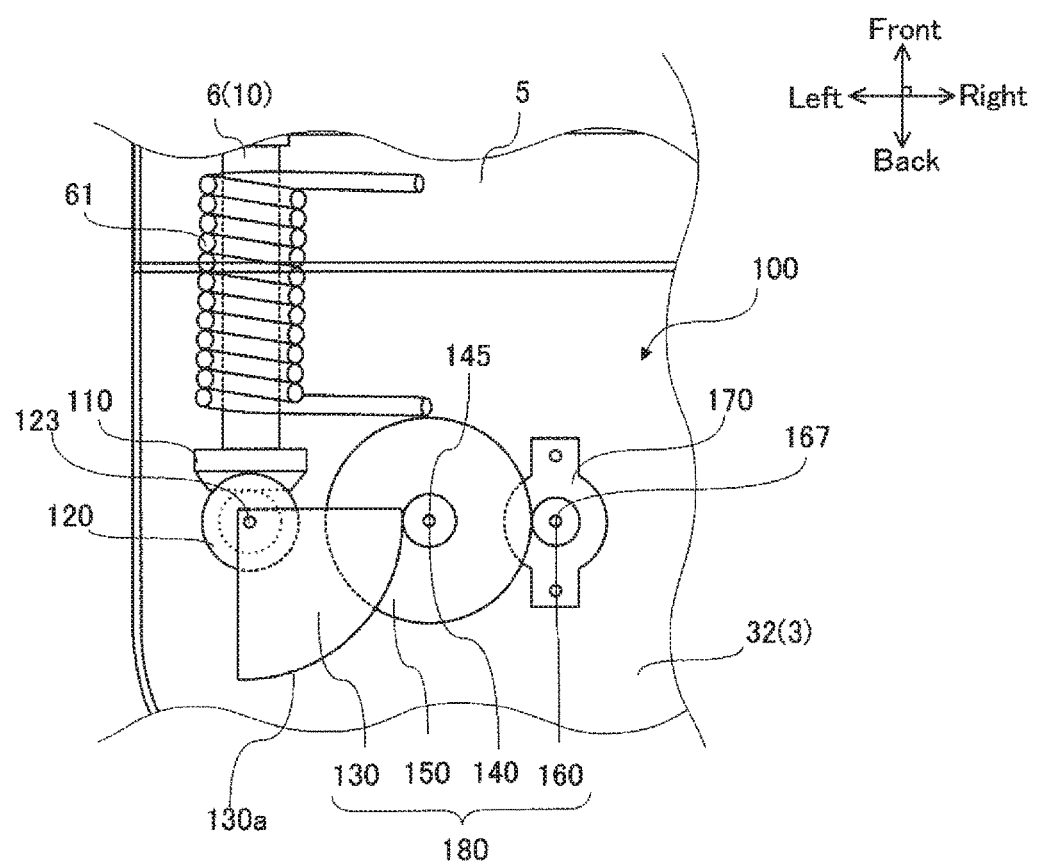
FIG. 8 is a partially enlarged view schematically showing a swing speed-reducing element in a lid mechanism of a second embodiment.

FIGS. 1 to 3 show the lid mechanism 1 according to a first embodiment, and FIGS. 4 and 5 show an example in which the lid mechanism 1 according to the first embodiment is applied to a console box 13. Furthermore, FIGS. 6 and 7 show an arm unit 53 in the lid mechanism 1 according to the first embodiment. FIG. 8 shows an alternative embodiment in which a first damper 63 and a second damper 73 according to the first embodiment are used as a swing speed-reducing element 100, as a lid mechanism 1 according to a second embodiment.

As shown in FIGS. 4 and 5, the lid mechanism 1 of the first embodiment, together with a box main body 11 having a containing section 12, configures the console box 13 disposed between a driver's seat and a passenger's seat. The box main body 11 is a box-shaped body having the containing section 12 that can accommodate articles and the like and that is open toward an upper side of a vehicle. The opening has an outer edge shape substantially the same as that of a lid 2.

The lid mechanism 1 of the first embodiment is attached to an upper side of the box main body 11, and includes a base section 3 and the lid 2. The base section 3 includes a front base section 31 configuring a front end-side portion of the lid mechanism 1, and a rear base section 32 configuring a rear end-side portion of the lid mechanism 1. The lid 2 is interposed between the front base section 31 and the rear base section 32. The front base section 31 and the rear base section 32 are integrated to the box main body 11. The lid 2 is supported so as to be swingable in both left and right directions with respect to the front base section 31 and the rear base section 32. As shown in FIG. 1, in a closed state in which the lid 2 is in a closed state, the lid 2, the front base section 31, and the rear base section 32 are flush with one another.

The lid 2 changes among the closed state of shielding the containing section 12 from the interior of a vehicle; a first opened state of exposing the containing section 12 when an arm section 5 and a lid main body section 4 are swung with a first supporting shaft 6, to be described later, as a center; and a second opened state of exposing the containing section 12 when the lid main body section 4 is swung with a second supporting shaft 7, to be described later, as a center. The first opened state and the second opened state are both states in which at least a part of the containing section 12 is exposed to the interior of the vehicle.

As shown in FIG. 1, the lid 2 includes the lid main body section 4, the arm section 5, and a supporting shaft 10 including the first supporting shaft 6 and the second supporting shaft 7. The arm section 5 is disposed side by side with the lid main body section 4 on a rear end side of the lid main body section 4. Specifically, the arm section 5 is interposed between the lid main body section 4 and the rear base section 32 to selectively open and close the lid 2 from a left end side or a right end side with the supporting shaft 10 as a center of swing. The arm section 5 is swingable with respect to the rear base section 32, and is also swingable with respect to the lid main body section 4. In the supporting shaft 10, the first supporting shaft 6 swingably supports the arm section 5 with respect to the rear base section 32, and the second supporting shaft 7 swingably supports the lid main body section 4 with respect to the arm section 5. In FIG. 1, the first supporting shaft 6 is disposed on the left end side of the lid 2, and the second supporting shaft 7 is disposed on the right end side of the lid 2.

The lid main body section 4 in the first embodiment has a hollow structure in which an inner panel (not shown) and an outer panel (not shown) are integrated. The inner panel is located on a box main body 11 side, and the outer panel is located on a vehicle interior side. The lid main body section 4 includes a lock mechanism 8 disposed between the inner panel and the outer panel.

The lock mechanism 8 locks and unlocks the lid 2. In the present specification, locking of the lid 2 means that the lock mechanism 8 prevents the lid 2 from changing from the closed state to the first opened state and the second opened state. The unlocking of the lid 2 means releasing the lock. When the lid 2 is unlocked, the lid 2 can be selectively changed from the closed state to the first opened state or the second opened state. As shown in FIG. 1, the lock mechanism 8 includes a first lock mechanism 81 disposed on a left end side of the lid main body section 4, and a second lock mechanism 82 disposed on a right end side of the lid main body section 4.

As shown in FIGS. 1 to 3, the first lock mechanism 81 includes a first rod 811, a first sub-rod 812, a first synchronizing element 813, a first bias member 814, and a first switch 86.

The first rod 811 is a rod-shaped body disposed on a back side of the lid main body section 4. The first sub-rod 812 is a rod-shaped body disposed on a front side of the lid main body section 4. The first sub-rod 812 includes, on a front end side, a projection 812a that engages with the first switch 86, and a rod protrusion 812b that makes contact with a first restricting section 9a to be described later, and on a rear end side, an engagement projection 812c that can be inserted to a transmission rod engagement hole 84b to be described later. The first rod 811 and the first sub-rod 812 are supported, movably in the front and back direction, by the lid main body section 4.

The first synchronizing element 813 synchronizes the first rod 811 and the first sub-rod 812 in a direction of approaching toward each other or in a direction of separating from each other. In the first embodiment, the first synchronizing element 813 is a disc-shaped rotation mechanism rotatably supported by the lid main body section 4. At a radially outward portion of the first synchronizing element 813, a front end of the first rod 811, a rear end of the first sub-rod 812, and one end of the first bias member 814 are supported while being circumferentially spaced apart from one another. More specifically, the front end of the first rod 811 and the rear end of the first sub-rod 812 are disposed substantially symmetrically with respect to a rotation center of the first synchronizing element 813. One end of the first bias member 814 is disposed between the front end of the first rod 811 and the rear end of the first sub-rod 812.

The first bias member 814 biases the first rod 811 and the first sub-rod 812 such that the first rod 811 and the first sub-rod 812 move in the direction of separating from each other. In the first embodiment, the first bias member 814 is a helical spring and has one end supported by the first synchronizing element 813 and the other end supported by the lid main body section 4. More specifically, the first bias member 814 biases the first synchronizing element 813 such that the first synchronizing element 813 always rotates in a clockwise direction in FIG. 1.

The first switch 86 is a releasing section that releases the lock of the first lock mechanism 81, and is disposed on a left side wall on the front end side of the lid main body section 4. In the first embodiment, the first switch 86 is configured so as to be pushed toward a right direction by an operator, as shown with an outlined arrow near the first switch 86 of FIG. 3.

The first switch 86 includes a long groove-shaped cutout 86a. The cutout 86a is extended in an inclined manner from a right front side toward a left back side. The projection 812a of the first sub-rod 812 is projected out toward the cutout 86a to engage with the cutout 86a. The projection 812a is movable along the shape of the cutout 86a within the cutout 86a of the first switch 86.

As shown in FIGS. 1 and 2, when the lid 2 is in the closed state (see FIG. 1) and the first opened state (see FIG. 2), the front end of the first sub-rod 812 is projected out toward the front side than the lid main body section 4 to engage with the front base section 31. Furthermore, the rear end of the first rod 811 is projected out toward the back side than the lid main body section 4 to engage with the arm section 5. As shown in FIG. 3, when the lid 2 is in the second opened state, the front end of the first sub-rod 812 and the rear end of the first rod 811 both enter the lid main body section 4.

As shown in FIGS. 1 and 2, a state in which the front end of the first sub-rod 812 and the rear end of the first rod 811 are both projected out than the lid main body section 4 is referred to as a locked state of the first lock mechanism 81 (hereinafter referred to as a first locked state). Moreover, as shown in FIG. 3, a state in which the front end of the first sub-rod 812 and the rear end of the first rod 811 both enter the lid main body section 4 is referred to as an unlocked state of the first lock mechanism 81 (hereinafter referred to as a first unlocked state).

As shown in FIGS. 1 to 3, the second lock mechanism 82 includes a second rod 821, a second sub-rod 822, a second synchronizing element 823, a second bias member 824, and a second switch 87.

The second rod 821 is a rod-shaped body disposed on the back side of the lid main body section 4. The second sub-rod 822 is a rod-shaped body disposed on the front side of the lid main body section 4. The second sub-rod 822 includes, on a front end side, a projection 822a that engages with the second switch 87, and a rod protrusion 822b that makes contact with a second restricting section 9b to be described later. The second rod 821 and the second sub-rod 822 are supported, movably in the front and back direction, by the lid main body section 4.

The second synchronizing element 823 synchronizes the second rod 821 and the second sub-rod 822 in a direction of approaching toward each other or in a direction of separating from each other. In the first embodiment, the second synchronizing element 823 is a disc-shaped rotation mechanism rotatably supported by the lid main body section 4. At a radially outward portion of the second synchronizing element 823, a front end of the second rod 821, a rear end of the second sub-rod 822, one end of the second bias member 824, and a right end of a transmission rod 83 to be described later are supported while being circumferentially spaced apart from one another. More specifically, the front end of the second rod 821 and the rear end of the second sub-rod 822 are disposed substantially symmetrically with respect to a rotation center of the second synchronizing element 823. One end of the second bias member 824 and the right end of the transmission rod 83 are disposed, between the front end of the second rod 821 and the rear end of the second sub-rod 822, substantially symmetrically with respect to the rotation center of the second synchronizing element 823.

The second bias member 824 biases the second rod 821 and the second sub-rod 822 such that the second rod 821 and the second sub-rod 822 move in the direction of separating from each other. In the first embodiment, the second bias member 824 is a helical spring and has one end supported by the second synchronizing element 823 and the other end supported by the lid main body section 4. More specifically, the second bias member 824 biases the second synchronizing element 823 such that the second synchronizing element 823 always rotates in a counterclockwise direction in FIG. 1.

The second switch 87 is a releasing section that releases the lock of the second lock mechanism 82, and is disposed on a right side wall on the front end side of the lid main body section 4. In the first embodiment, the second switch 87 is configured so as to be pushed toward a left direction by the operator, as shown with an outlined arrow near the second switch 87 of FIG. 2.

The second switch 87 includes a long groove-shaped cutout 87a. The cutout 87a extends in an inclined manner from a left front side toward a right back side. The projection 822a of the second sub-rod 822 is projected out toward the cutout 87a to engage with the cutout 87a. The projection 822a is movable along the shape of the cutout 87a within the cutout 87a of the second switch 87.

As shown in FIGS. 1 and 3, when the lid 2 is in the closed state (see FIG. 1) and the second opened state (see FIG. 3), the front end of the second sub-rod 822 is projected out toward the front side than the lid main body section 4 to engage with the front base section 31. Furthermore, the rear end of the second rod 821 is projected out toward the back side than the lid main body section 4 to engage with the rear base section 32 by way of the arm section 5. As shown in FIG. 2, when the lid 2 is in the first opened state, the front end of the second sub-rod 822 enters the lid main body section 4, and the rear end of the second rod 821 enters the arm section 5.

As shown in FIGS. 1 and 3, a state in which the front end of the second sub-rod 822 is projected out than the lid main body section 4 and the rear end of the second rod 821 is projected out than the arm section 5 is referred to as a locked state of the second lock mechanism 82 (hereinafter referred to as a second locked state). As shown in FIG. 2, a state in which the front end of the second sub-rod 822 enters the lid main body section 4 and the rear end of the second rod 821 enters the arm section 5 is referred to as an unlocked state of the second lock mechanism 82 (hereinafter referred to as a second unlocked state).

The lock mechanism 8 in the lid mechanism 1 of the first embodiment further includes the transmission rod 83. When one of the first lock mechanism 81 and the second lock mechanism 82 is in the unlocked state, the transmission rod 83 prevents the other lock mechanism from changing from the locked state to the unlocked state.

As shown in FIGS. 1 to 3, the transmission rod 83 in the first embodiment is extended in a left and right direction. The transmission rod 83 is extended from the first lock mechanism 81 side to the second lock mechanism 82 side, and is supported, movably in the left and right direction, by a guide 85 disposed on the lid main body section 4.

A right end of the transmission rod 83 is supported by the second synchronizing element 823. The transmission rod 83 and the second bias member 824 supported by the second synchronizing element 823 are disposed substantially symmetrically with respect to the rotation center of the second synchronizing element 823. Therefore, as shown with an outlined arrow of FIG. 2, when the second sub-rod 822 and the second rod 821 are moved in the direction of approaching toward each other, the transmission rod 83 moves in the right direction from its original position. When the second sub-rod 822 and the second rod 821 are moved in the direction of separating from each other, the transmission rod 83 moves to its original position in the left direction. In other words, the transmission rod 83 moves in the right direction so as to separate from the first lock mechanism 81 when the second synchronizing element 823 is rotated in the clockwise direction, and the transmission rod 83 moves to its original position in the left direction so as to approach the first lock mechanism 81 when the second synchronizing element 823 is rotated in the counterclockwise direction.

The transmission rod 83 has a transmission rod distal end section 84 which is a distal end portion on the left end side of the transmission rod 83. The transmission rod distal end section 84 is a free end. The transmission rod distal end section 84 has a transmission rod engagement hole 84b in the form of a through hole. A portion located on the leftmost end of the transmission rod distal end section 84 in a peripheral edge of the transmission rod engagement hole 84b is referred to as a transmission rod contacting section 84a. The transmission rod distal end section 84 can engage with the engagement projection 812c disposed on the first sub-rod 812. In other words, when the second lock mechanism 82 is in the second locked state while the lid 2 is in the closed state and the second opened state, the engagement projection 812c can be inserted into the transmission rod engagement hole 84b. On the other hand, when the second lock mechanism 82 is in the second unlocked state while the lid 2 is in the first opened state, the transmission rod contacting section 84a can be brought into contact with the distal end of the engagement projection 812c.

As shown in FIG. 1, when the lid 2 is in the closed state, the transmission rod 83 is at its original position, the first lock mechanism 81 is in the first locked state, and the second lock mechanism 82 is in the second locked state. When the lid 2 is in the closed state, the transmission rod engagement hole 84b and the engagement projection 812c face each other in the front and back direction, but the transmission rod engagement hole 84b and the engagement projection 812c are not engaged with each other. In this case, the transmission rod engagement hole 84b is located on the back side of the engagement projection 812c. Furthermore, in this case, the transmission rod contacting section 84a and the engagement projection 812c are also not engaged with each other.

The arm section 5 in the first embodiment is a plate-shaped body having a longitudinal direction directed to the left and right. A horizontal width (i.e. the longitudinal direction directed to the left and right) of the arm section 5 is substantially the same as that of the lid main body section 4. The arm section 5 includes a first arm through hole 51 on a left end side, and a second arm through hole 52 on a right end side.

The first supporting shaft 6 is inserted into the first arm through hole 51. More specifically, a front end of the first supporting shaft 6 is inserted to the first arm through hole 51 and fixed to the arm section 5. A rear end of the first supporting shaft 6 is projected out of the first arm through hole 51, and rotatably supported by the rear base section 32. Thus, the first supporting shaft 6 allows the arm section 5 to be swingable with respect to the rear base section 32, and furthermore, is integrally swung with the arm section 5. A first arm spring 61 that biases the arm section 5 toward a first fully-opened position shown in FIG. 4 is wound around the first supporting shaft 6.

The first arm spring 61 in the first embodiment is a torsion spring. One end of the first arm spring 61 is inserted into and fixed to the first arm through hole 51, and the other end is fixed to the rear base section 32.

A collar 72 is inserted into the second arm through hole 52. The collar 72 is a tubular body including a through hole 72b. A front end of the collar 72 is rotatably supported by the lid main body section 4, and a rear end of the collar 72 is fixed to the second arm through hole 52. The collar 72 rotatably (swingably) supports the lid main body section 4.

A second arm spring 71 that biases the lid main body section 4 toward a second fully-opened position of the lid 2 shown in FIG. 5 is wound around an outer circumference of the collar 72. A second rod rear end 821a, which is a rear end of the second rod 821, is inserted into the through hole 72b of the collar 72. The second rod rear end 821a can be passed through the arm section 5 and engage with the rear base section 32.

In the first embodiment, the second supporting shaft 7 corresponds to the collar 72. The second rod rear end 821a that can engage with the rear base section 32 is inserted into the through hole 72b of the collar 72. In other words, the collar 72 and the second rod rear end 821a are coaxially disposed.

The second arm spring 71 is a torsion spring and has one end fixed to the interior of the lid main body section 4, and the other end inserted into the second arm through hole 52 and fixed to the arm section 5.

The lid mechanism 1 of the first embodiment has a restricting section 9 in which the second lock mechanism 82 maintains the second unlocked state in the first opened state, that is, when the first lock mechanism 81 is in the first locked state, and the first lock mechanism 81 maintains the first unlocked state in the second opened state, that is, when the second lock mechanism 82 is in the second locked state.

As shown in FIG. 1, the restricting section 9 in the first embodiment includes the first restricting section 9a disposed on the first lock mechanism 81 side and the second restricting section 9b disposed on the second lock mechanism 82 side. The first restricting section 9a and the second restricting section 9b have a similar structure. Thus, the first restricting section 9a will be described below.

The first restricting section 9a includes a restricting plate 91 and a restricting plate bias section 92. The restricting plate 91 is a long plate body provided along the front and back direction, and is supported by the lid main body section 4 at a central section 91c so as to be inclinable in a seesaw form. The restricting plate bias section 92 biases the restricting plate 91 such that a rear end 91b of the restricting plate 91 is located on the upper side relative to a front end 91a. In other words, under a state of not receiving the force from another member, the first restricting section 9a has the rear end 91b of the restricting plate 91 located on the upper side relative to the front end 91a.

The restricting plate 91 is disposed such that the rear end 91b can be brought into contact with the rod protrusion 812b disposed on the first sub-rod 812 of the first lock mechanism 81. The front end 91a of the restricting plate 91 is projected out toward the front side than the lid main body section 4, and is disposed to be able to make contact with the front base section 31.

The lid mechanism 1 of the first embodiment includes the first damper 63 and the second damper 73 that reduce a swinging speed of the lid 2. In the first opened state of the lid 2, the first damper 63 reduces the swinging speed of the lid 2 that swings according to the biasing force of the first arm spring 61. In the second state of the lid 2, the second damper 73 reduces the swinging speed of the lid 2 that swings according to the biasing force of the second arm spring 71.

The first damper 63 includes a first damper gear 63a of a spur gear that meshes with a spur gear shaped shaft tooth row 6a provided on the first supporting shaft 6, and a first damper main body section 63b that reduces the rotation of the first damper gear 63a. The second damper 73 includes a second damper gear 73a of a spur gear that meshes with a spur gear shaped collar tooth row 72a provided on the collar 72, and a second damper main body section 73b that reduces the rotation of the second damper gear 73a. The first damper 63 reduces the rotation speed of the first supporting shaft 6, and the second damper 73 reduces the rotation speed of the second supporting shaft 7. In the lid mechanism 1 of the first embodiment, an oil damper is used for the first damper main body section 63b of the first damper 63 and the second damper main body section 73b of the second damper 73, but the present invention is not particularly limited to the oil damper.

In the lid mechanism 1 according to the first embodiment, the arm section 5 is unitized as the arm unit 53, and such an arm unit 53 is assembled to the lid mechanism 1. The arm unit 53 is formed by integrating the arm section 5, the first arm spring 61 and the second arm spring 71, the first supporting shaft 6 around which the first arm spring 61 is wound, the collar 72 around which the second arm spring 71 is wound, and the first damper 63 and the second damper 73 along with a first assembly member 54 and a second assembly member 55.

More specifically, as shown in FIGS. 6 and 7, the first assembly member 54 is disposed side by side on the left rear end side of the arm section 5. The first assembly member 54 rotatably supports the first supporting shaft 6 inserted into the first arm through hole 51 and projected out toward the back side from the first arm through hole 51. The first assembly member 54 fixes the end of the first arm spring 61 projected out toward the back side from the first arm through hole 51. Furthermore, the first assembly member 54 holds the first damper 63 such that the first damper 63 meshes with the shaft tooth row 6a provided on the first supporting shaft 6.

The second assembly member 55 is disposed side by side on the right front end side of the arm section 5. The second assembly member 55 supports the collar 72 inserted into the second arm through hole 52 and projected out toward the front side from the second arm through hole 52. The second assembly member 55 fixes the end of the second arm spring 71 projected out toward the front side from the second arm through hole 52. Furthermore, the second assembly member 55 holds the second damper 73 such that the second damper 73 meshes with the collar tooth row 72a provided on the collar 72.

The arm unit 53 unitized in the above manner is disposed such that the arm section 5 is interposed between the rear base section 32 and the lid main body section 4 in the lid mechanism 1 of the first embodiment. The first assembly member 54 in the arm unit 53 is assembled to the rear base section 32, and the second assembly member 55 is assembled to the lid main body section 4.

The arm section 5 is unitized to obtain the arm unit 53, and the arm unit 53 is then assembled to the lid mechanism 1, so that the assembly of the lid mechanism 1 of the first embodiment is facilitated, and consequently, the productivity is enhanced.

The operation of the lid mechanism 1 of the first embodiment will be hereinafter described. In the lid mechanism 1 of the first embodiment, the lid 2 is configured to be openable and closable from either the right end side or the left end side. When the lid 2 is opened and closed from the right end side, the lid main body section 4 and the arm section 5 are integrally swung to cause the lid 2 to change between the closed state and the first opened state. In this case, the front end of the first sub-rod 812 of the first lock mechanism 81 and the first supporting shaft 6 become the swing shaft of the lid 2. When the lid 2 is opened and closed from the left end side, the arm section 5 is not swung and only the lid main body section 4 is swung to cause the lid 2 to change between the closed state and the second opened state. In this case, the front end of the second sub-rod 822 of the second lock mechanism 82 and the second supporting shaft 7 become the swing shaft of the lid 2.

The state of the lid 2 changing from the closed state to the first opened state will be described with reference to FIGS. 2 and 4. Outlined arrows in FIG. 2 represent the respective moving directions of the second switch 87, the second sub-rod 822, the second rod 821, and the transmission rod 83.

First, the second locked state of the second lock mechanism 82 is changed to the second unlocked state. In other words, the operator presses the second switch 87 to move the second switch 87 toward the left side. When the operator pushes the second switch 87 toward the left side, a groove wall of the cutout 87a presses the projection 822a toward the left side. Since the cutout 87a is inclined from the left front side toward the right back side, in this case, the projection 822a is moved toward the back side in the cutout 87a. Therefore, the second sub-rod 822 including the projection 822a is also moved toward the back side. Thus, the cutout 87a formed in the second switch 87 converts the force directed toward the left side applied from the operator to the force directed toward the back side, and moves the second sub-rod 822 including the projection 822a toward the back side.

When the second sub-rod 822 is moved toward the back side, the second synchronizing element 823 supporting the second sub-rod 822 is rotated in the clockwise direction. In this case, the second rod 821 supported by the second synchronizing element 823 is pulled toward the front side by the second synchronizing element 823 thereby being moved toward the front side. In other words, when the operator presses the second switch 87, the second sub-rod 822 and the second rod 821 are moved in the direction of approaching toward each other by the rotation of the second synchronizing element 823 in the clockwise direction. Thus, the front end of the second sub-rod 822 disengages from the front base section 31, and the rear end of the second rod 821 disengages from the rear base section 32. The second lock mechanism 82 is thus changed from the second locked state to the second unlocked state. In the second locked state, the second sub-rod 822 receives the biasing force from the second bias member 824 directed toward the front side by way of the second synchronizing element 823. Thus, the operator presses the second switch 87 with the force acting against the biasing force of the second bias member 824 to move the second sub-rod 822 toward the back side.

When the second lock mechanism 82 is in the second unlocked state, the lid main body section 4 and the arm section 5 are integrally swung in the opening direction according to the biasing force of the first arm spring 61. In this case, the first lock mechanism 81 is in the first locked state, and thus the front end of the first sub-rod 812 disposed on the left end side and the first supporting shaft 6 become the swing shaft of the lid 2. Thus, the lid 2 is changed from the closed state to the first opened state according to the biasing force of the first arm spring 61.

When the lid 2 is changed from the closed state to the first opened state, the arm section 5 and the lid main body section 4 are integrally coupled to each other at the respective left end sides and the respective right end sides. Specifically, since the first lock mechanism 81 is in the first locked state, the first rod 811 engages with the arm section 5. Thus, the arm section 5 and the lid main body section 4 are coupled to each other by the first rod 811 at the respective left end sides.

The front end of the collar 72 inserted into the second arm through hole 52 is extended to the lid main body section 4 to rotatably (swingably) support the lid main body section 4. The arm section 5 and the lid main body section 4 are coupled to each other by the collar 72 at the respective right end sides. When the lid 2 is changed from the closed state to the first opened state, the second lock mechanism 82 is in the second unlocked state. In this case, the second rod rear end 821a of the second rod 821 is disengaged from the rear base section 32. The second rod rear end 821a is accommodated inside the arm section 5 and is located in the second arm through hole 52.

As described above, the arm section 5 and the lid main body section 4 are integrally coupled to each other at the respective left end sides and the respective right end sides. Therefore, when the lid 2 is changed from the closed state to the first opened state, the arm section 5 and the lid main body section 4 are integrally swung. In this case, since the arm section 5 is swung, the arm section 5 is not left on the box main body 11 side. That is, since the arm section 5 is not left on the box main body 11 side, a wide opening area of the containing section 12 can be ensured. Furthermore, since the arm section 5 is not left on the box main body 11 side, the appearance of the containing section 12 is enhanced.

The lid mechanism 1 of the first embodiment includes the transmission rod 83. When the operator presses the second switch 87, the second sub-rod 822 and the second rod 821 move in the direction of approaching toward each other. In this case, the second synchronizing element 823 is rotated in the clockwise direction, and the transmission rod 83 supported by the second synchronizing element 823 is pulled by the second synchronizing element 823 thereby being moved toward the right side. When the transmission rod 83 is moved toward the right side, the transmission rod contacting section 84a of the transmission rod distal end section 84 faces the engagement projection 812c provided on the first sub-rod 812. In this case, the transmission rod contacting section 84a is located on the leading side on the movement path of the engagement projection 812c.

Since the transmission rod contacting section 84a is located on the leading side of the movement path of the engagement projection 812c, the movement of the first sub-rod 812 toward the back side is prevented. This is because the engagement projection 812c of the first sub-rod 812 makes contact with the transmission rod contacting section 84a located on the leading side on the movement path when the first sub-rod 812 in the first locked state attempts to move toward the back side. That is, the transmission rod contacting section 84a prevents the movement of the first sub-rod 812 toward the back side by way of the engagement projection 812c.

When the movement of the first sub-rod 812 toward the back side is prevented, the movement of the first rod 811 synchronized with the first sub-rod 812 is also prevented by the first synchronizing element 813. Thus, in the first opened state, the first locked state of the first lock mechanism 81 cannot be released while the second unlocked state of the second lock mechanism 82 is maintained by the second restricting section 9b of the restricting section 9, as will be described later. That is, the transmission rod 83 prevents the first lock mechanism 81 from changing from the first locked state to the first unlocked state. As a result, in the lid mechanism 1 of the first embodiment, the disengagement of the front end of the first sub-rod 812 acting as the swing shaft from the front base section 31 and the disengagement of the rear end of the first rod 811 from the arm section 5 can be prevented, and furthermore, the lid 2 can be prevented from disengaging from the base section 3 and being detached from the box main body 11.

In the lid mechanism 1 of the first embodiment, the restricting section 9 is provided on the lid main body section 4. As described above, when the operator presses the second switch 87, the second lock mechanism 82 is changed from the second locked state to the second unlocked state. Accordingly, the transmission rod 83 prevents the first lock mechanism 81 from changing from the first locked state to the first unlocked state. However, if the restricting section 9 is not provided, when the operator releases the pressing of the second switch 87, the second unlocked state is changed to the second locked state according to the biasing force of the second bias member 824. Accordingly, since the transmission rod 83 returns to its original position, the prevention of the change from the first locked state to the first unlocked state by the transmission rod 83 is released. Thus, the first lock mechanism 81 in the first locked state can be changed to the first unlocked state. In such a case, the first lock mechanism 81 and the second lock mechanism 82 can be in the unlocked state simultaneously, so that the lid 2 possibly disengages from the base section 3. In view of the above, the restricting section 9 includes the second restricting section 9b that prevents the second lock mechanism 82 from changing from the second unlocked state to the second locked state when the lid 2 is swung with the front end of the first sub-rod 812 and the first supporting shaft 6 as the swing shaft to bring the lid 2 to the first opened state. In other words, when the lid 2 is in the first opened state, the second restricting section 9b maintains the second unlocked state. The operation of the second restricting section 9b will be hereinafter described.

The second restricting section 9b has the front end 91a and the rear end 91b of the restricting plate 91 inclined in a seesaw manner. The restricting plate 91 has the front end 91a biased to be directed downward by the restricting plate bias section 92. In the closed state of the lid 2, the front end 91a of the restricting plate 91 is brought into contact with the front base section 31, and is pushed up by the front base section 31 against the biasing force of the restricting plate bias section 92. In this case, the restricting plate 91 is located such that the rear end 91b is directed downward than the front end 91a, and the rear end 91b of the restricting plate 91 is located on the lower side relative to the rod protrusion 822b. That is, in this case, the rear end 91b and the rod protrusion 822b are offset in the height direction, and hence the rear end 91b of the restricting plate 91 and the rod protrusion 822b are not engaged with each other.

When the lid 2 in the closed state is changed to the first opened state, the second sub-rod 822 of the second lock mechanism 82 is moved toward the back side. Furthermore, the second restricting section 9b located on the front side of the right end of the lid main body section 4 changes its position together with the lid main body section 4, and separates from the front base section 31. When the second restricting section 9b separates from the front base section 31, the restricting plate 91 of the second restricting section 9b is swung such that the front end 91a is directed downward and the rear end 91b is directed upward according to the biasing force of the restricting plate bias section 92. As a result, the rear end 91b of the restricting plate 91 is located on the movement path of the rod protrusion 822b of the second sub-rod 822 moved toward the back side. Therefore, the rod protrusion 822b is thereby engageable with the rear end 91b of the restricting plate 91.

As described above, the operator presses the second switch 87 to change the lid 2 from the closed state to the first opened state. Thereafter, when the operator releases the second switch 87, the second sub-rod 822 and the second rod 821 moved in the direction of approaching toward each other against the biasing force of the second bias member 824 as a result of the operator pressing the second switch 87 return to their original positions. In other words, the second sub-rod 822 and the second rod 821 move in a direction of separating from each other. When the second sub-rod 822 and the second rod 821 return to their original positions, the second switch 87 is also returned to its original position accordingly.

When the lid 2 is changed from the closed state to the first opened state, the rear end 91b of the restricting plate 91 of the second restricting section 9b changes its position so as to be engageable with the rod protrusion 822b. That is, the movement of the second sub-rod 822 in the forward direction is prevented by the engagement of the rear end 91b and the rod protrusion 822b. Therefore, the movement of the second sub-rod 822 toward the front side and the movement of the second rod 821 toward the back side according to the biasing force of the second bias member 824 are prevented. As a result, in the first opened state of the lid 2, the second unlocked state of the second lock mechanism 82 is maintained by the second restricting section 9b.

The lid mechanism 1 of the first embodiment includes the first damper 63 that reduces the swinging speed of the lid 2. Therefore, the lid 2 can be gradually swung, so that the lid mechanism 1 of the first embodiment can present a luxury sense.

The state of the lid 2 changing from the first opened state to the closed state will be described with reference to FIGS. 2 and 4. First, the operator presses the lid 2, in which the arm section 5 and the lid main body section 4 are integrated, against the biasing force of the first arm spring 61. The lid 2 is thereby swung until shielding the opening of the containing section 12 from the interior of the vehicle. Lastly, the lid 2 is changed from the first opened state to the closed state, the regulation by the second restricting section 9b is released as will be described later, and the second lock mechanism 82 is changed from the second unlocked state to the second locked state.

When the lid 2 is changed from the first opened state to the closed state, the second restricting section 9b disposed on the right front side of the lid main body section 4 approaches the front base section 31. In the first opened state, the restricting plate 91 of the second restricting section 9b is disposed in an inclined manner with the rear end 91b directed upward and the front end 91a directed downward by the restricting plate bias section 92. The rear end 91b of the restricting plate 91 engages with the rod protrusion 822b, and the front end 91a of the restricting plate 91 is projected out toward the front side from the lid main body section 4. That is, in this case, the second restricting section 9b maintains the second unlocked state of the second lock mechanism 82, and the transmission rod 83 consequently prevents the first lock mechanism 81 from changing from the first locked state to the first unlocked state.

When the lid 2 in such state is swung to a predetermined position to be in the closed state, the front end 91a of the restricting plate 91 of the second restricting section 9b is brought into contact with the front base section 31. Thereafter, the front end 91a is gradually pushed up by the front base section 31 with the swinging of the lid 2 to be in the closed state. On the other hand, the rear end 91b lifted up according to the biasing force of the restricting plate bias section 92 is pushed down against the biasing force of the restricting plate bias section 92 when the front end 91a is pushed up. In other words, the restricting plate 91 of the second restricting section 9b is swung such that the front end 91a is directed upward and the rear end 91b is directed downward. The rear end 91b gradually changes its position so as to be located on the lower side relative to the rod protrusion 822b of the second sub-rod 822.

After the state of the lid 2 is completely changed to the closed state, the rear end 91b is offset to the lower side relative to the rod protrusion 822b. That is, in this case, the rear end 91b of the restricting plate 91 disengages from the rod protrusion 822b, and is deviated from the movement path of the rod protrusion 822b. The rear end 91b then changes its position so as to be located on the lower side relative to the rod protrusion 822b. Therefore, the rear end 91b of the restricting plate 91 of the second restricting section 9b is deviated from the movement path of the rod protrusion 822b, so that the movement of the second sub-rod 822 is permitted. When the second sub-rod 822 becomes movable, the second sub-rod 822 is moved toward the front side according to the biasing force of the second bias member 824. Furthermore, the second rod 821 is also moved toward the back side in this case. The second sub-rod 822 and the second rod 821 are thereby moved in the direction of separating from each other according to the biasing force of the second bias member 824. The distal end of the second sub-rod 822 is then projected out toward the front side than the lid main body section 4 to engage with the front base section 31, and the distal end of the second rod 821 is projected out than the arm section 5 to engage with the rear base section 32.

In other words, in the closed state of the lid 2, the rear end 91b of the restricting plate 91 of the second restricting section 9b is deviated from the movement path of the rod protrusion 822b, and the movement of the second sub-rod 822 is permitted. In other words, the action of the second restricting section 9b maintaining the second unlocked state is released. The second lock mechanism 82 thus changes its state to the second locked state.

When the movement of the second sub-rod 822 and the second rod 821 is permitted, the movement of the transmission rod 83 is also permitted accordingly. When the second sub-rod 822 and the second rod 821 are moved in the direction of separating from each other according to the biasing force of the second bias member 824, the second synchronizing element 823 is rotated in the counterclockwise direction, and thus the transmission rod 83 supported by the second synchronizing element 823 is also moved toward the left side according to the rotation of the second synchronizing element 823 in the counterclockwise direction. When the transmission rod 83 is moved toward the left side, the transmission rod contacting section 84a is deviated from the movement path of the engagement projection 812c disposed on the first sub-rod 812. The transmission rod engagement hole 84b instead faces the engagement projection 812c. The engagement projection 812c thus can enter and leave the transmission rod engagement hole 84b. In other words, in this case, the movement of the first sub-rod 812 is permitted and the first sub-rod 812 and the first rod 811 are movable in the direction of approaching toward each other, so that the first lock mechanism 81 can be changed from the first locked state to the first unlocked state.

The state of the lid 2 changing from the closed state to the second opened state will now be described with reference to FIGS. 3 and 5. Outlined arrows in FIG. 3 represent the respective moving directions of the first switch 86, the first sub-rod 812, and the first rod 811.

First, the first locked state of the first lock mechanism 81 is changed to the first unlocked state. In other words, the operator presses the first switch 86 to move the first switch 86 toward the right side. Through the operation similar to the second switch 87, the distal end on the front side of the first sub-rod 812 disengages from the front base section 31, and the distal end on the back side of the first rod 811 disengages from the arm section 5. The state of the first lock mechanism 81 is then changed to the first unlocked state.

When the first lock mechanism 81 is in the first unlocked state, the second lock mechanism 82 disposed on the right end side and the second supporting shaft 7 act as the swing shaft, and the lid main body section 4 is swung in the opening direction thereof according to the biasing force of the second arm spring 71. The lid main body section 4 serving as the lid 2 is then changed from the closed state to the second opened state. Since the second damper 73 similar to the first damper 63 is disposed on the second supporting shaft 7, the lid 2 in the second opened state can also be gradually swung, similar to the swinging of the lid 2 in the first opened state.

In the second opened state of the lid 2 as well, the restricting section 9 described in relation to the first opened state of the lid 2 is disposed to maintain the first unlocked state of the first lock mechanism 81. Therefore, even in the second opened state of the lid 2, the first unlocked state of the first lock mechanism 81 is maintained by the first restricting section 9a. On the contrary, as will be described below, the action of the transmission rod 83 prevents the second lock mechanism 82 from changing from the second locked state to the second unlocked state in the second opened state of the lid 2.

When the operator presses the first switch 86, the first lock mechanism 81 is changed from the first locked state to the first unlocked state, and the first sub-rod 812 and the first rod 811 are moved in the direction of approaching toward each other against the biasing force of the first bias member 814. When the first sub-rod 812 is moved in the direction of approaching the first rod 811, that is, the backward direction, the engagement projection 812c disposed on the first sub-rod 812 is inserted into the transmission rod engagement hole 84b at the transmission rod distal end section 84. Thus, in the first unlocked state of the first lock mechanism 81, the engagement projection 812c is inserted to the transmission rod engagement hole 84b.

In the second opened state of the lid 2, the first unlocked state of the first lock mechanism 81 is maintained by the first restricting section 9a. Thus, the movement of the first sub-rod 812 toward the front side is prevented. Therefore, in the second opened state of the lid 2, the state in which the engagement projection 812c of the first sub-rod 812 is inserted into the transmission rod engagement hole 84b is maintained.

The movement of the transmission rod 83 in the left and right direction is prevented by the engagement of the engagement projection 812c and the transmission rod engagement hole 84b. When the movement of the transmission rod 83 is prevented, the rotation movement of the second synchronizing element 823 supporting the transmission rod 83 is also prevented. The movement of the second sub-rod 822 and the second rod 821 is also prevented as a result, so that the second switch 87 cannot be pressed. In such a manner, the transmission rod 83 in the second opened state prevents the second lock mechanism 82 from changing from the second locked state to the second unlocked state, and maintains the second locked state. As a result, in the lid mechanism 1 of the first embodiment, the distal end of the second sub-rod 822 acting as the swing shaft in the second opened state can be prevented from disengaging from the front base section 31, and furthermore, the lid 2 can be prevented from disengaging from the base section 3 and being detached from the box main body 11.

The state of the lid 2 changing from the second opened state to the closed state will now be described with reference to FIGS. 3 and 5. First, the operator presses the lid main body section 4 against the biasing force of the second arm spring 71. The lid main body section 4 is swung until shielding the opening of the containing section 12 from the interior of the vehicle. Lastly, the lid 2 is changed from the second opened state to the closed state, the regulation by the first restricting section 9a, to be described later, is released, and the first lock mechanism 81 is changed from the first unlocked state to the first locked state.

When the lid 2 is changed from the second opened state to the closed state, the first restricting section 9a disposed on the left front side of the lid main body section 4 performs an operation similar to that in the case where the lid 2 is changed from the first opened state to the closed state. In other words, the state change of the first lock mechanism 81 from the first unlocked state to the first locked state prevented by the first restricting section 9a in the second opened state of the lid 2 is permitted, and the first lock mechanism 81 is changed from the first unlocked state to the first locked state.

In this case, the movement of the first sub-rod 812 and the first rod 811 is permitted, and accordingly, the movement of the transmission rod 83 is also permitted. In other words, the first sub-rod 812 and the first rod 811 are moved in the direction of separating from each other according to the biasing force of the first bias member 814, and according to the movement of the first sub-rod 812 toward the front side, the engagement projection 812c inserted to the transmission rod engagement hole 84b disengages from the transmission rod engagement hole 84b. Thus, the engagement of the engagement projection 812c and the transmission rod engagement hole 84b is released, and the transmission rod 83 is movable toward the right side. Therefore, the second synchronizing element 823 supporting the transmission rod 83 can rotate, and thus the second sub-rod 822 and the second rod 821 can move. As a result, the second lock mechanism 82 can be changed from the second locked state to the second unlocked state.

The effects in the first embodiment will be described below. In the lid mechanism 1 of the first embodiment, the arm section 5 is disposed side by side on the rear end side of the lid main body section 4, and the first supporting shaft 6 and the second supporting shaft 7 are respectively disposed on the left and right ends of the arm section 5 and the rear base section 32. Thus, the lid 2 including the lid main body section 4 and the arm section 5 is swung from the right end side with respect to the base section 3, and the lid main body section 4 is swung from the left end side with respect to the arm section 5 and the base section 3. The arm section 5 realizes the selective opening/closing operation of the lid 2 from the left end side or the right end side. Therefore, according to the lid mechanism 1 of the first embodiment, the two arms are disposed in the conventional dual swing container box, but only one arm section may be disposed. Therefore, the number of components can be reduced. The space on the box main body 11 side for disposing the arm section 5 can be reduced by reducing the number of arm sections 5 to one. Therefore, the box capacity of the containing section 12 disposed in the box main body 11 can be increased, and the opening area of the containing section 12 can be increased.

Furthermore, in the lid mechanism 1 of the first embodiment, the arm section 5 is disposed only on the rear end side of the containing section 12. That is, the arm section 5 is not disposed on the front end side of the containing section 12. Therefore, the appearance of the front end side of the containing section 12 can be enhanced, and hence the appearance of the containing section 12 with the lid being opened can also be enhanced.

In the lid mechanism 1 of the first embodiment, the swing shafts that swing the lid 2 are disposed on both left and right end sides of the arm section 5. The swing shaft on the left end side of the arm section 5 is the first supporting shaft 6, and is inserted to the arm section 5 and the rear base section 32. The swing shaft on the right end side of the arm section 5 is the second supporting shaft 7, and is inserted to the arm section 5 and the lid main body section 4. Thus, by providing the swing shafts in an offset arrangement on both left and right end sides of the arm section 5, one swing shaft that does not act as the swing shaft at the time of the swinging of the lid 2 does not have a detachable configuration. The arrangement position of the swing shaft is thus always fixed. Therefore, the lid mechanism 1 of the first embodiment is advantageous in suppressing position shift and breakage of the swing shaft, abnormal noise such as rattling, and the like that are caused by the detachable swing shaft.

In the lid mechanism 1 of the first embodiment, the rotation mechanism is adopted in place of the rack and pinion mechanism conventionally used as the synchronizing element. In other words, in the lid mechanism 1 of the first embodiment, the first synchronizing element 813 of the first lock mechanism 81 and the second synchronizing element 823 of the second lock mechanism 82 are both rotating bodies that are rotation mechanisms. Thus, the rattling caused by the meshing of the tooth row can be effectively suppressed, compared to the conventional structure that uses the gear in the rack and pinion mechanism used as the synchronizing element. Therefore, the abnormal noise generated by rattling and the like can be effectively suppressed according to the lid mechanism 1 of the first embodiment.

In the lid mechanism 1 of the first embodiment, the transmission rod 83 is biased by the second bias member 824 by way of the second synchronizing element 823, which is the rotating body. The transmission rod 83, which is an accidental operation preventing section, is thus less likely to rattle. Similar to the transmission rod 83, the first sub-rod 812 and the first rod 811 of the first lock mechanism 81 in the first embodiment are biased by the first bias member 814 by way of the first synchronizing element 813, and the second sub-rod 822 and the second rod 821 of the second lock mechanism 82 are biased by the second bias member 824 by way of the second synchronizing element 823, and thus they are less likely to rattle.

In the lid mechanism 1 of the first embodiment, the transmission rod 83 coupled with the second synchronizing element 823 is used as the accidental operation preventing section that prevents both left and right lock mechanisms 8 from shifting to the unlocked state simultaneously. Such an accidental operation preventing section includes two lock mechanisms and a switching section as conventionally disclosed in, for example, Japanese Unexamined Patent Publication No. 2013-220709.

The two lock mechanisms each has a bolt lock pin structure including a front lock pin, a rear lock pin, and a link body that synchronizes the front lock pin and the rear lock pin. In the two lock mechanisms, when the lid is swung from the one end side, the lock mechanism on one end side is unlocked and the lock mechanism on the other end side is locked to act as the swing shaft. When the lid is swung from the other end side, the lock mechanism on the other end side is unlocked, and the lock mechanism on the one end side is locked to act as the swing shaft.

However, with just the two lock mechanisms, the lock mechanism acting as the swing shaft may be in unlocked state by the erroneous operation and the like performed by the operator when the lid is being swung. That is, the two lock mechanisms may simultaneously be in the unlocked state, and the lid may be detached from the box main body. In order to resolve such drawback, Japanese Unexamined Patent Publication No. 2013-220709 discloses the dual swing type container box including a switching section that enables the lid to be selectively swung from the one end side or the other end side, and that can maintain the locked state of one lock mechanism when the relevant one lock mechanism acts as the swing shaft.

The switching section includes a coupling rod that couples the two lock mechanisms in a bridge form, and a centering member that engages with a central part of the coupling rod. The coupling rod is supported by the lid to be movable toward one end side or the other end side. When the coupling rod is moved toward one end side or the other end side, the one lock mechanism acting as the swing shaft of the lid maintains the locked state while the lid is being swung. The centering member includes a cam mechanism including a coil spring. In a state where the lid is closed, the centering member returns the coupling rod moved toward one end side or the other end side to a neutral position by the biasing force of the coil spring. Thus, in the state where the lid is closed, the locked state of one of the two lock mechanisms is again released.

Thus, the switching section disclosed in Japanese Unexamined Patent Publication No. 2013-220709 enables the lid to be selectively swung from one end side or the other end side and prevents one lock mechanism acting as the swing shaft from being changed from the locked state to the unlocked state. Therefore, according to the switching section disclosed in Japanese Unexamined Patent Publication No. 2013-220709, the drawback that the lid is detached from the box when the lid is being swung can be resolved.

However, the cam mechanism using the coil spring is adopted for the centering member in the switching section disclosed in Japanese Unexamined Patent Publication No. 2013-220709. Thus, the structure becomes complicated and the assembly is cumbersome.

The lid mechanism 1 of the first embodiment thus uses the transmission rod 83 in place of the cam mechanism using the coil spring. Therefore, the structure becomes simple, and the assembly property enhances. More specifically, the transmission rod 83 in the first embodiment is configured such that the right end is supported by the second synchronizing element 823, and the left end can engage with the engagement projection 812c disposed on the first sub-rod 812. The transmission rod 83 is moved in synchronization with the state change of the second lock mechanism 82 by the second synchronizing element 823. Thus, the lid mechanism 1 of the first embodiment including the transmission rod 83, which is the accidental operation preventing section, has a structure that does not adopt the cam mechanism for the accidental operation preventing section. Therefore, in the first embodiment, the transmission rod 83, which is the accidental operation preventing section, contributes to reducing the number of components and is also advantageous in enhancing the assembly property due to its simple structure.

Second Embodiment

In the first embodiment, the swinging speed of the lid 2 is reduced by the first damper 63 or the second damper 73, but instead, a swing speed-reducing element 100 may be used. With the lid mechanism 1 in which the first damper 63 and the second damper 73 according to the first embodiment are replaced with a swing speed-reducing element 100 as a lid mechanism 1 of a second embodiment, the swing speed-reducing element 100 will be hereinafter described with reference to FIG. 8.

The swing speed-reducing element 100 reduces the rotation speed of the supporting shaft 10 to reduce the swinging speed of the lid 2. The swing speed-reducing element 100 is disposed on each of the first supporting shaft 6 side and the second supporting shaft 7 side. The swing speed-reducing element 100 on the first supporting shaft 6 side reduces the rotation speed of the first supporting shaft 6, and reduces the swinging speed of the lid 2. The swing speed-reducing element 100 on the second supporting shaft 7 side reduces the rotation speed of the second supporting shaft 7, and reduces the swinging speed of the lid 2. The configuration of the swing speed-reducing element 100 is the same on the first supporting shaft 6 side and the second supporting shaft 7 side. Therefore, the swing speed-reducing element 100 on the first supporting shaft 6 side will be described, as shown in FIG. 8.

The swing speed-reducing element 100 includes a first gear 110 disposed on the first supporting shaft 6, a second gear 120 that meshes with the first gear 110, and a damper 170 that connects with the second gear 120 byway of a coupling gear 180. The coupling gear 180 in the second embodiment includes a third gear 130, a fourth gear 140, a fifth gear 150, and a sixth gear 160, as will be described later.

The first gear 110 is disposed coaxially and integrally with the first supporting shaft 6. The first gear 110 rotates in cooperation with the swinging of the lid 2. The first gear 110 in the second embodiment is a gear having a conical shape, and is a straight bevel gear where a tooth trace is straight. The first gear 110 meshes with the second gear 120, which is a gear having a conical shape as will be described later, to configure a bevel gear.

The second gear 120 is a straight bevel gear that is the same as the first gear 110. As described above, the first gear 110 and the second gear 120 configure the bevel gear, where a rotation shaft of the first gear 110 and a rotation shaft of the second gear 120 are disposed in directions intersecting each other. In the second embodiment, the rotation shaft of the first gear 110 and the rotation shaft of the second gear 120 are disposed in directions orthogonal to each other. The second gear 120 is rotatably supported by a first rotation shaft 123 supported by the rear base section 32.

The third gear 130 is rotatably supported by the first rotation shaft 123 and is integrated with the second gear 120. In other words, the third gear 130 is coaxially integrated with the second gear 120. The third gear 130 in the second embodiment is a fan shaped spur gear having a larger diameter than the second gear 120. A tooth row section 130*a* of the third gear 130 is formed in a circular arc shape. The tooth row section 130*a* of the third gear 130 is meshed with the fourth gear 140.

The fourth gear 140 is rotatably supported by a second rotation shaft 145 supported by the rear base section 32. The fourth gear 140 is a spur gear, and has a smaller diameter and a lesser number of teeth than those of the third gear 130. The fifth gear 150 is a spur gear, and is rotatably supported by the second rotation shaft 145 and is integrated with the fourth gear 140. In other words, the fifth gear 150 is coaxially integrated with the fourth gear. Furthermore, the fifth gear 150 has a larger diameter and a greater number of teeth than those of the fourth gear 140. In the second embodiment, the fourth gear 140 and the fifth gear 150 configure a two-stage gear train. The fifth gear 150 is meshed with the sixth gear 160.

The sixth gear 160 is a spur gear, and is rotatably supported by the damper 170 with a third rotation shaft 167. The sixth gear 160 has a lesser number of teeth than that of the fifth gear 150. Furthermore, the sixth gear 160 desirably has the same number of teeth as that of the fourth gear 140 or a lesser number of teeth than that of the fourth gear 140.

The damper 170 is fixed to the rear base section 32. The damper 170 includes a sealed container (not shown) filled with oil, a rotating body (not shown) rotatably disposed in the sealed container, and a rotation shaft (not shown) that rotatably supports the rotating body and that is passed through to the exterior of the sealed container, and is adapted to damp the rotation of the rotating body with the viscosity resistance of the oil. In the second embodiment, the rotation shaft of the damper 170 coincides with the third rotation shaft 167 supporting the sixth gear 160. In other words, the damper 170 damps the rotation of the sixth gear 160 by way of the third rotation shaft 167.

In the swing speed-reducing element 100 of the second embodiment configured as above, the first gear 110 disposed on the first supporting shaft 6 is rotated by the swinging of the lid 2, and the sixth gear 160 connected to the damper 170 is rotated by way of the second gear 120, the third gear 130, the fourth gear 140, and the fifth gear 150. Since the rotation of the sixth gear 160 is damped by the damper 170, the swinging speed of the lid 2 is reduced.

In the lid mechanism 1 according to the first embodiment, the gear (first damper gear 63*a*, second damper gear 73*a*, hereinafter referred to as a damper gear) directly connected to the damper, and the gear (shaft tooth row 6*a*, collar tooth row 72*a*, hereinafter referred to as a supporting shaft gear) disposed on the supporting shaft 10 are both spur gears. In such a case, the size of the diameters of the damper gear and the supporting shaft gear are both restricted to the thickness of the lid mechanism 1. The thickness of the lid mechanism 1 refers to the size in the up and down direction in the state where the lid 2 is closed. In other words, the thickness refers to the direction from the near side toward the far side in the plane of drawing in FIG. 1. The supporting shaft 10 is disposed to extend in the front and back direction.

For example, in a thin lid mechanism in which the thickness of the lid mechanism is made thin, the size of the diameters of the damper gear and the supporting shaft gear of the spur gears in the lid mechanism 1 according to the first embodiment is particularly restricted. If the size of the diameters of the damper gear and the supporting shaft gear is restricted, sufficient teeth number ratio (gear ratio) of the damper gear and the supporting shaft gear cannot be ensured, and the rotation number of the damper gear may reduce. If the rotation number of the damper gear reduces, the damper may not be able to exhibit the deceleration torque for sufficiently reducing the swinging speed of the lid 2.

However, according to the swing speed-reducing element 100 of the second embodiment, the first gear 110 having the supporting shaft 10 as the rotation shaft and the second gear 120 that meshes with the first gear 110 are meshed such that the respective rotation shafts are directed in the intersecting direction. In other words, the first gear 110 and the second gear 120 are meshed such that respective extended lines of the supporting shaft 10 (first supporting shaft 6, second supporting shaft 7) and the first rotation shaft 123 intersect. Thus, the radial direction of the second gear 120 does not need to be directed in the thickness direction of the lid mechanism 1 as long as the second gear 120 can be disposed with respect to the first gear 110 in the above manner. That is, the radial size of the second gear 120 is not restricted by the thickness of the lid mechanism 1. Thus, as shown in FIG. 8, the spur gear (third gear 130 to sixth gear 160), which is the coupling gear 180, that can be connected to the second gear 120 can also be disposed without being restricted by the thickness of the lid mechanism 1.

Thus, in the second embodiment, the coupling gear 180 can be configured without being restricted by the thickness of the lid mechanism 1, so that the gear ratio of the first gear 110, which is a drive source, and the sixth gear 160, which is a to-be-driven source directly connected to the damper 170, can be designed large. In other words, the rotation number of the sixth gear 160 can be increased. Thus, in the swing speed-reducing element 100 of the second embodiment, it is advantageous in sufficiently increasing the deceleration torque by the damper 170, and effectively reducing the swinging speed of the lid 2. Furthermore, according to the swing speed-reducing element 100 of the second embodiment, the thin lid can be realized, so that effects such as enhancement in designability, reduction in product weight, and the like can be obtained.

In the swing speed-reducing element 100 of the second embodiment, the teeth number of the tooth row section 130*a* of the third gear 130 and the teeth number of the fifth gear 150 are desirably made sufficiently larger than the teeth number of the fourth gear 140 and the teeth number of the sixth gear 160. Thus, the rotation number of the sixth gear 160 connected to the damper 170 can be made sufficiently large and the swinging speed of the lid 2 can be effectively reduced by configuring the coupling gear 180 in the above manner.

The first gear 110 and the second gear 120 in the second embodiment both configure the bevel gear using the straight bevel gear. In other words, the rotation shafts of the first gear 110 and the second gear 120 are desirably disposed to be orthogonal to each other (a shaft angle of 90°). However, the shaft angle of the first gear 110 and the second gear 120 may be 90°±20°. The gears of the first gear 110 and the second gear 120 may be spiral bevel gears. Furthermore, the first gear 110 and the second gear 120 may be skew shafts such as screw gears instead of the intersecting shafts described above.

The preferred embodiments of the present invention have been described in detail with reference to the drawings, but the present invention is not limited to the first and second embodiments, and can be modified in various ways within a scope not deviating from the gist of the present invention.

For example, the base section 3 in the embodiments is assembled to and integrated with the box main body 11, but the base section 3 may be the box main body 11. Furthermore, the lid 2 in the embodiments is supported by the front base section 31 and the rear base section 32, but may be supported by one of the front base section 31 and the rear base section 32. In other words, the lid 2 may have a configuration in which the lid main body section 4 is supported by the rear base section 32 by way of the arm section 5.

The arm section 5 in the embodiments is disposed on the rear end side of the containing section 12, but may be disposed on the front end side. The first arm spring 61 and the second arm spring 71 are disposed on both left and right end sides of the arm section 5, but such arm springs may be omitted or one of the arm springs may be disposed. Furthermore, the first arm spring 61 and the second arm spring 71 may be, for example, turn over springs that bias toward both the opening direction and the closing direction. The first damper 63 and the second damper 73 are disposed on both left and right end sides of the arm section 5, but may be omitted.

The second supporting shaft 7 in the embodiments is the collar 72. However, the collar 72 can be omitted. In such a case, the second supporting shaft 7 corresponds to a second rod rear end 821*a* that can engage with the rear base section 32. In other words, a part of the lock mechanism 8 can be used as a part of the supporting shaft 10.

The lock mechanism 8 in the embodiments has a structure of being unlocked when the front and rear rods are moved in the direction of approaching toward each other. In other words, the lock mechanism 8 merely needs to have a so-called bolt lock structure, and the configuration thereof is not particularly limited. For example, the rotation mechanism of the rotating body and the rod in the embodiments may be the rack and pinion mechanism.

The transmission rod distal end section 84 of the transmission rod 83 in the embodiments includes the transmission rod contacting section 84*a* and the transmission rod engagement hole 84*b*. The transmission rod engagement hole 84*b* in the embodiments is a through hole, but instead, may be a recess that can tolerate the front and rear movement of the first sub-rod 812 of the first lock mechanism 81. Furthermore, in place of the transmission rod distal end section 84 and the engagement projection 812*c* of the first sub-rod 812 in the embodiments, for example, the engagement projection 812*c* of the first sub-rod 812 may be used as a projection including a contacting section corresponding to the transmission rod contacting section 84*a* and an engagement hole corresponding to the transmission rod engagement hole 84*b*, and the transmission rod distal end section 84 may be used as an engagement projection corresponding to the engagement projection 812*c* of the first sub-rod 812. In this case, in the first unlocked state of the first lock mechanism 81, the engagement hole of the first sub-rod 812 and the engagement projection of the transmission rod 83 are engaged to prevent the state change of the transmission rod 83. As a result, the second lock mechanism 82 is prevented from changing from the second locked state to the second unlocked state. In the second unlocked state of the second lock mechanism 82, the engagement projection of the transmission rod 83 is located on the movement path of the contacting section of the first sub-rod 812 to prevent the movement of the first sub-rod 812. As a result, the first lock mechanism 81 is prevented from changing from the first locked state to the first unlocked state.

In the embodiment, the transmission rod 83 and the engagement projection 812*c* are disposed as an accidental operation preventing structure, but may be omitted. Furthermore, in the embodiments, the restricting section 9 is disposed, but the restricting section 9 may be omitted.

The problems of the present invention can be solved and the effects of the present invention can be obtained even with the configuration in which each configuration of the embodiments is modified in the above manner.

The lid mechanism of the present invention can be expressed as below. It should be noted that the term "base section" in the present invention corresponds to the rear base section in the embodiments, and the term "sub-base section" in the present invention corresponds to the front base section in the embodiments.

<1> A dual swing lid mechanism 1 includes a base section integrated with a box main body 11 having a containing section, and a lid openable and closable from one end side or the other end side with respect to the base section, in which the lid includes a supporting shaft, a lid main body section, and an arm section, the supporting shaft has a first supporting shaft that swingably supports the arm section with respect to the base section at the one end side and a second supporting shaft that swingably supports the lid main body section with respect to the arm section at the other end side, the lid changes among a closed state of shielding a containing section, a first opened state of exposing the containing section when the arm section and the lid main body section are swung with the first supporting shaft as a center, and a second opened state of exposing the containing section when the lid main body section is swung with the second supporting shaft as the center, and the lid main body section has a lock mechanism including a first rod engageable with the arm section at the one end side and a second rod engageable with the base section at the other end side, the first rod engages with the arm section in the closed state and the first opened state and disengages from the arm section in the second opened state, and the second rod engages with the base section in the closed state and the second opened state and disengages from the base section in the first opened state.

<2> The lid mechanism according to <1> further includes a first arm spring that is disposed on the first supporting shaft and biases the arm section in a direction the lid opens in the first opened state, and a second arm spring that is disposed on the second supporting shaft and biases the lid main body section in the direction the lid opens in the second opened state.

<3> In the lid mechanism according to <1> or <2>, the second supporting shaft includes a collar that has a through hole, is fixed to one of the lid main body section and the arm section, and is relatively rotatable with respect to the other section, and the second rod engages with the base section through the through hole.

<4> In the lid mechanism 1 according to <1> or <2>, one part of the second rod is the second supporting shaft.

<5> The lid mechanism according to anyone of <1> to <4> further includes a sub-base section disposed on a side opposite to the base section with the lid interposed therebetween, in which the lid main body section includes a first sub-rod engageable with the sub-base section at one end side, a first synchronizing element that synchronizes the first rod and the first sub-rod, a second sub-rod engageable with the sub-base section at the other end side, and a second synchronizing element that synchronizes the second rod and the second sub-rod, the first sub-rod engages with the sub-base section in the closed state and the first opened state and disengages from the sub-base section in the second opened state, and the second sub-rod engages with the sub-base section in the closed state and the second opened state and disengages from the sub-base section in the first opened state.

<6> In the lid mechanism according to <5>, the first sub-rod acts as a swing shaft of the arm section and the lid main body section together with the first supporting shaft in the first opened state, and the second sub-rod acts as a swing shaft of the lid main body section together with the second supporting shaft in the second opened state.

<7> The lid mechanism 1 according to <1> to <6> further includes a swing speed-reducing element that reduces a swinging speed of the lid, in which the swing speed-reducing element includes a first gear that is disposed on the supporting shaft and that coaxially and integrally rotates with the supporting shaft, a second gear that meshes with the first gear, and a damper that connects with the second gear by way of a coupling gear and reduces a rotation speed of the second gear, and the first gear and the second gear are disposed in directions respective rotation shafts intersect each other.

The following contents may be added to the lid mechanism of the present invention.

<8> A dual swing lid mechanism includes a base section integrated with a box main body having a containing section, and a lid swingable from one end side with the other end side as a center and swingable from the other end side with the one end side as the center with respect to the base section, in which the lid includes a lock mechanism that locks and unlocks the lid with respect to the base section, the lock mechanism includes a first lock mechanism on one end side and a second lock mechanism on the other end side, the first lock mechanism includes a first rod, a first sub-rod, and a first synchronizing element that synchronizes movement of the first rod and the first sub-rod in directions of approaching toward or separating from each other, the second lock mechanism includes a second rod, a second sub-rod, and a second synchronizing element that synchronizes the second rod and the second sub-rod in directions of approaching toward or separating from each other, the lock mechanism changes between a first locked state in which the first rod and the first sub-rod move in the direction of separating from each other to engage with the base section and a first unlocked state in which the first rod and the first sub-rod move in the direction of approaching toward each other to disengage from the base section, the second lock mechanism changes between a second locked state in which the second rod and the second sub-rod move in the direction of separating from each other to engage with the base section and a second unlocked state in which the second rod and the second sub-rod move in the direction of approaching toward each other to disengage from the base section, the lid is swung with the second sub-rod as the center in the first unlocked state, the lid is swung with the first sub-rod as the center in the second unlocked state, the lock mechanism further includes a transmission rod that couples to the second lock mechanism and that synchronizes with the state change of the second lock mechanism to state change with respect to the first lock mechanism, the first lock mechanism prevents the state change of the transmission rod and prevents the state change of the second lock mechanism from the second locked state to the second unlocked state in the first unlocked state, and the transmission rod prevents the state change of the first lock mechanism 81 from the first locked state to the first unlocked state in the second unlocked state.

<9> In the lid mechanism according to <8>, the second synchronizing element is a rotating body, and the transmission rod reciprocates in cooperation with the rotating body.

<10> In the lid mechanism according to <8> or <9>, the first sub-rod includes an engagement projection that projects out toward the transmission rod, the transmission rod includes a transmission rod engagement hole engageable with the engagement projection, the engagement projection engages with the transmission rod engagement hole to prevent the movement of the transmission rod in the first unlocked state, and the transmission rod makes contact with the engagement projection to prevent the movement of the first sub-rod in the second unlocked state.

<11> The lid mechanism according to any one of <8> to <10>, further includes a second restricting section that maintains the second unlocked state when the lid is swung from the other end side with the one end side as the center, and a first restricting section that maintains the first unlocked state when the lid is swung from the one end side with the other end side as the center.

What is claimed is:

1. A dual swing lid mechanism comprising:
   a base section integrated with a box main body having a containing section; and
   a lid openable and closable from one end side or the other end side with respect to the base section,
   wherein
   the lid includes a supporting shaft, a lid main body section, and an arm section,
   the supporting shaft has a first supporting shaft that swingably supports the arm section with respect to the base section at the one end side and a second supporting shaft that swingably supports the lid main body section with respect to the arm section at the other end side,
   the lid main body section has a lock mechanism including a first rod engageable with the arm section at the one end side and a second rod engageable with the base section at the other end side,
   the lid changes among a closed state of shielding a containing section, a first opened state of exposing the containing section when the arm section and the lid main body section are swung with the first supporting shaft as a center, and a second opened state of exposing the containing section when the lid main body section is swung with the second supporting shaft as the center,
   the first rod engages with the arm section in the closed state and the first opened state and disengages from the arm section in the second opened state, and
   the second rod engages with the base section in the closed state and the second opened state and disengages from the base section in the first opened state.

2. The lid mechanism according to claim 1, further comprising:
   a first arm spring that is disposed on the first supporting shaft and biases the arm section in a direction the lid opens in the first opened state; and
   a second arm spring that is disposed on the second supporting shaft and biases the lid main body section in the direction the lid opens in the second opened state.

3. The lid mechanism according to claim 1, wherein
   the second supporting shaft includes a collar that has a through hole, is fixed to one of the lid main body section and the arm section, and is relatively rotatable with respect to the other section, and
   the second rod engages with the base section through the through hole.

4. The lid mechanism according to claim 1, wherein one part of the second rod is the second supporting shaft.

5. The lid mechanism according to claim 1, further comprising a sub-base section disposed on a side opposite to the base section with the lid interposed therebetween,
   wherein
   the lid main body section includes a first sub-rod engageable with the sub-base section at one end side, a first synchronizing element that synchronizes the first rod and the first sub-rod, a second sub-rod engageable with the sub-base section at the other end side, and a second synchronizing element that synchronizes the second rod and the second sub-rod,
   the first sub-rod engages with the sub-base section in the closed state and the first opened state and disengages from the sub-base section in the second opened state, and
   the second sub-rod engages with the sub-base section in the closed state and the second opened state and disengages from the sub-base section in the first opened state.

6. The lid mechanism according to claim 5, wherein
   the first sub-rod acts as a swing shaft of the arm section and the lid main body section together with the first supporting shaft in the first opened state, and
   the second sub-rod acts as a swing shaft of the lid main body section together with the second supporting shaft in the second opened state.

7. The lid mechanism according to claim 1, further comprising a swing speed-reducing element that reduces a swinging speed of the lid,
   wherein
   the swing speed-reducing element includes a first gear that is disposed on the supporting shaft and that coaxially and integrally rotates with the supporting shaft, a second gear that meshes with the first gear, and a damper that connects with the second gear by way of a coupling gear and reduces a rotation speed of the second gear, and
   the first gear and the second gear are disposed in directions respective rotation shafts intersect each other.

* * * * *